United States Patent
Hoenig

(10) Patent No.: US 6,302,944 B1
(45) Date of Patent: Oct. 16, 2001

(54) APPARATUS FOR EXTRACTING WATER VAPOR FROM AIR

(76) Inventor: Stuart Alfred Hoenig, 80 W. Yvon Dr., Tucson, AZ (US) 85704-5234

(*) Notice: Subject to any disclaimer, the term of this patent is extended or adjusted under 35 U.S.C. 154(b) by 0 days.

(21) Appl. No.: 09/551,333

(22) Filed: Apr. 18, 2000

Related U.S. Application Data

(60) Provisional application No. 60/130,754, filed on Apr. 23, 1999.

(51) Int. Cl.$^7$ ................................. B03C 3/16; B03C 3/49
(52) U.S. Cl. ........................... 96/16; 96/66; 96/97; 96/98
(58) Field of Search .......................... 96/97, 16, 66, 96/77, 98, 100

(56) References Cited

U.S. PATENT DOCUMENTS

| | | | |
|---|---|---|---|
| 4,955,991 | * 9/1990 | Torok et al. | 96/97 X |
| 5,667,564 | * 9/1997 | Weinberg | 96/66 X |
| 5,695,549 | * 12/1997 | Feldman et al. | 96/97 X |
| 5,820,660 | * 10/1998 | Ko | 96/97 X |
| 5,879,435 | * 3/1999 | Satyapal et al. | 96/16 |
| 5,948,141 | * 9/1999 | Abdel-Rahman | 96/97 X |
| 5,951,742 | * 9/1999 | Thwaites et al. | 96/100 X |

* cited by examiner

Primary Examiner—Richard L. Chiesa
(74) Attorney, Agent, or Firm—Gene Scott-Patent Law & Venture Group

(57) ABSTRACT

A dehumidifier uses high voltage to cause moisture to condense out of an airflow in contact with a series of needles and a screen forming the cathode and anode respectively of a diode structure. Condensate is sucked into small holes in either or both of the needles and/or the screen by a vacuum. Ultra-violet light is applied to reduce the incidence of ozone.

7 Claims, 3 Drawing Sheets

APPARATUS FOR EXTRACTING WATER VAPOR FROM AIR

This application claims the filing date of a previously filed provisional application having Ser. No. 60/130,754 and an assigned filing date of Apr. 23, 1999 and which contains subject matter substantially the same as that described and claimed in the present application.

BACKGROUND OF THE INVENTION

1. Field of the Invention

This invention relates generally to dehumidifiers, and more particularly to a water vapor extractor using high density electric fields.

2. Description of Related Art

The prior art teaches the use of cold, adsorptive and absorption surfaces for dehumidification. However, the prior art does not teach that a high voltage may be applied in the manner of the present invention to produce such effective dehumidification. The present invention fulfills these needs and provides further related advantages as described in the following summary.

SUMMARY OF THE INVENTION

The present invention teaches certain benefits in construction and use which give rise to the objectives described below.

The present invention provides a dehumidifier which uses high voltage to cause moisture to condense out of an airflow in contact with a series of needles and a screen forming the cathode and anode respectively of a diode structure. Condensate is sucked into small holes in either or both of the needles and, or the screen by a vacuum. Ultra-violet light is applied to reduce the incidence of ozone.

A primary objective of the present invention is to provide a dehumidifier having advantages not taught by the prior art.

Another objective is to provide such a device using high voltage electric field to produce the dehumidification effect.

A further objective is to provide such a device using ultra-violet light to reduce ozone generation.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
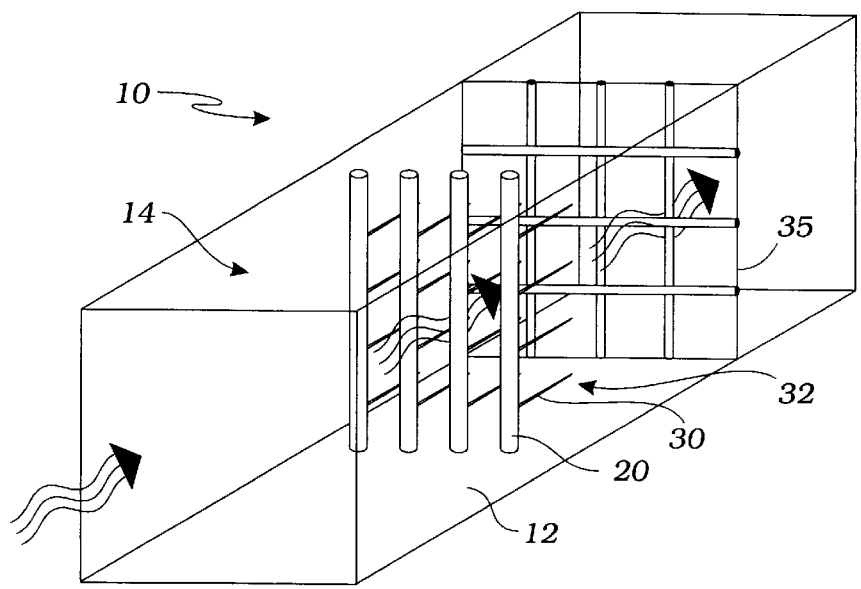
FIG. 1 is a perspective view of a mechanical schematic diagram of the preferred embodiment of the present invention.

The above described drawing figures illustrate the invention, an apparatus comprising a case 10 of an electrically non-conducting material such as plastic or wood, the case 10 including a case wall 12 for enclosing a case volume space 14 as shown in FIG. 1. The apparatus further includes a means for enabling an air flow into the case volume space 14 such as a set of louvers (not shown) or the equivalent and a means for enabling the air flow to exit the case volume space 14 such as a second set of louvers (not shown). The apparatus further includes a plurality of support stands 20 such as solid metal rods or hollow metal pipes or tubes, extending from the case wall 12 into the case volume space 14, each of the support stands 20 providing a plurality of solid or hollow needles 30 extending therefrom. In the case of hollow needles 30, each of the needles 30 providing a small aperture 32 at a terminal end thereof. The apparatus further includes, a high voltage power supply 40 enabled for generating a potential of tens of thousands of static volts relative to ground potential, the potential impressed upon the support stands 20 and the needles 30. The apparatus further includes a means for providing suction 50, such as is produced by a vacuum pump, to the support stands 20 and the hollow needles 30 for drawing air from the case volume space 14 through the needles 30 and the support stands 20 to a sink 60 such as a collection tray, for collection of condensed water vapor drawn into the support stands 20 from the needles 30 by the suction and then dripping downwardly within the support stands. A water pump 70 is preferably interconnected with the sink 60 for exhausting the condensed water vapor from the sink 60. In an improved embodiment of the present invention an ultra-violet light source 80 is engaged with the case wall 12 and positioned for directing ultra-violet light 82 across the case volume space 14 and this light is inventively directed between the needles 30 and a grounded metal screen 35 which is positioned to receive the air flow through it prior to its exiting the case volume space 14. The air flow is preferably forced by an air flow forcing means 90, such as a fan positioned for directing the air flow through the case volume space 14. The metal screen 35 is preferably made of copper or aluminum as is the support stands 20 and the needles 30. The metal screen 35 inventively is made of hollow tubes and provides a plurality of small apertures 32 similar to those of the needles 30. Moisture condenses on the screen 35 and is drawn into the interior of the screen 35 by vacuum suction from the suction pump 50 wherein it drips downwardly to be discharged into the sink 60. Alternatively, the invention may be made with solid needles 30 and a hollow screen 35 with the small apertures 32 for collection of moisture, or with hollow needles 30 and support stands 20, or with both hollow needles 30 and screen 35.

In an operating model of the invention the support stands 20 were constructed with ⅛ inch copper tubes and the screen was made with a 19" square surface area with ⅜ inch diameter hollow tubes with ⅛ inch diameter apertures 32. An ultra-violet lamp was used to reduce the generation of $O_3$ molecules.

Figure 2:
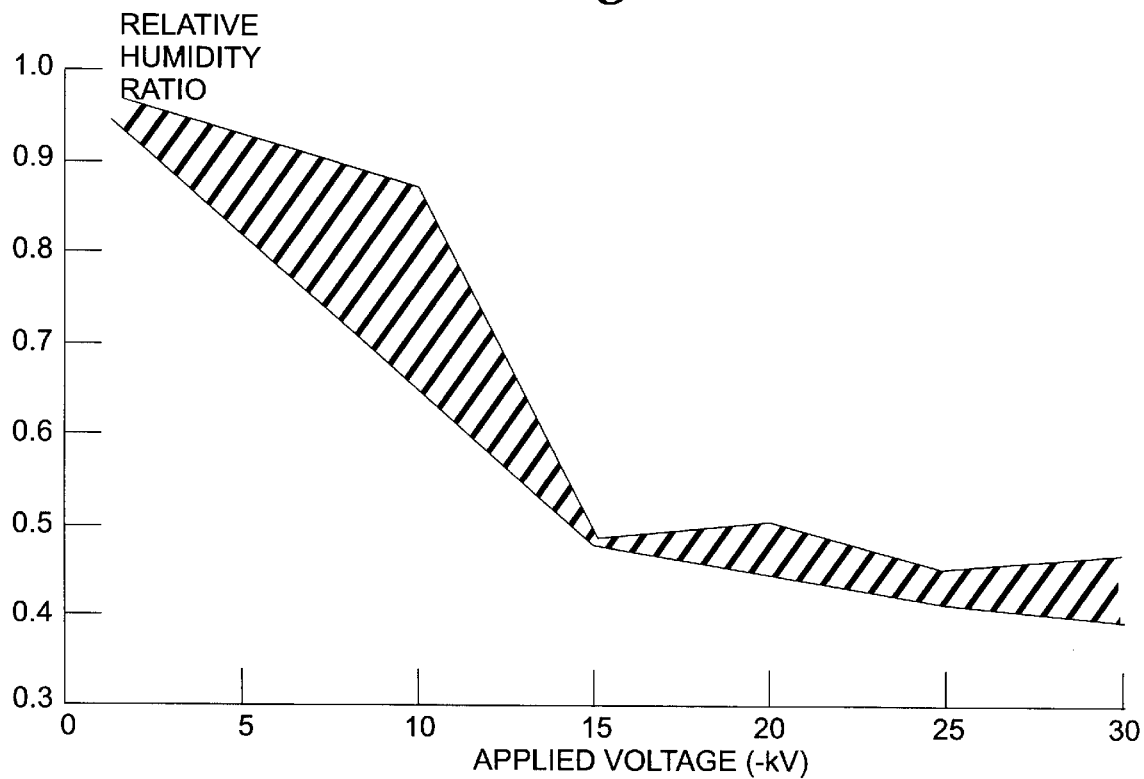
FIG. 2 is a diagram depicting relative humidity at the output of the present invention plotted against negative kilovolts applied in the present invention.
Figure 3:
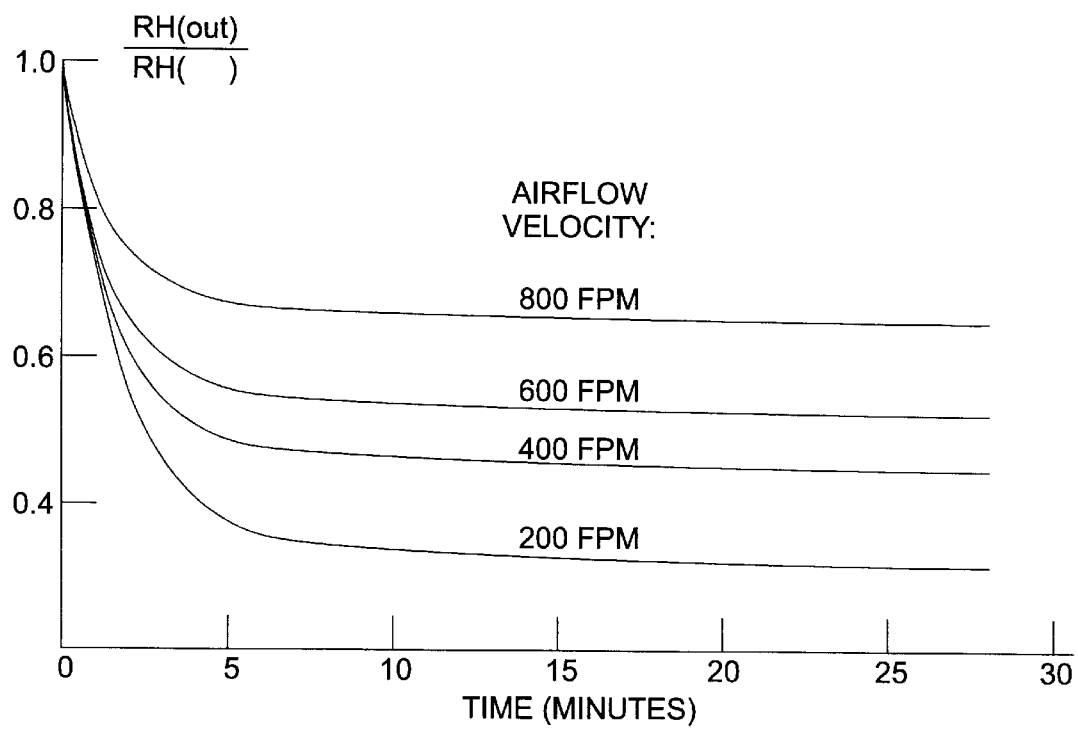
FIG. 3 is a plot of RHout/RHin, i.e, moisture reduction efficiency at the output, against time in minutes for a choice of fan speeds in the present invention.

Typically the apparatus is able to reduce an inflow of air at a relative humidity (RH) of between 88% and 94% to approximately 35% RH. FIG. 2 shows the dependency of RH on the applied voltage level. FIG. 3 shows the dependency of RH reduction on airflow rate and time. The time being measured as minutes duration within the electrical field E shown in FIG. 5.

Figure 4:
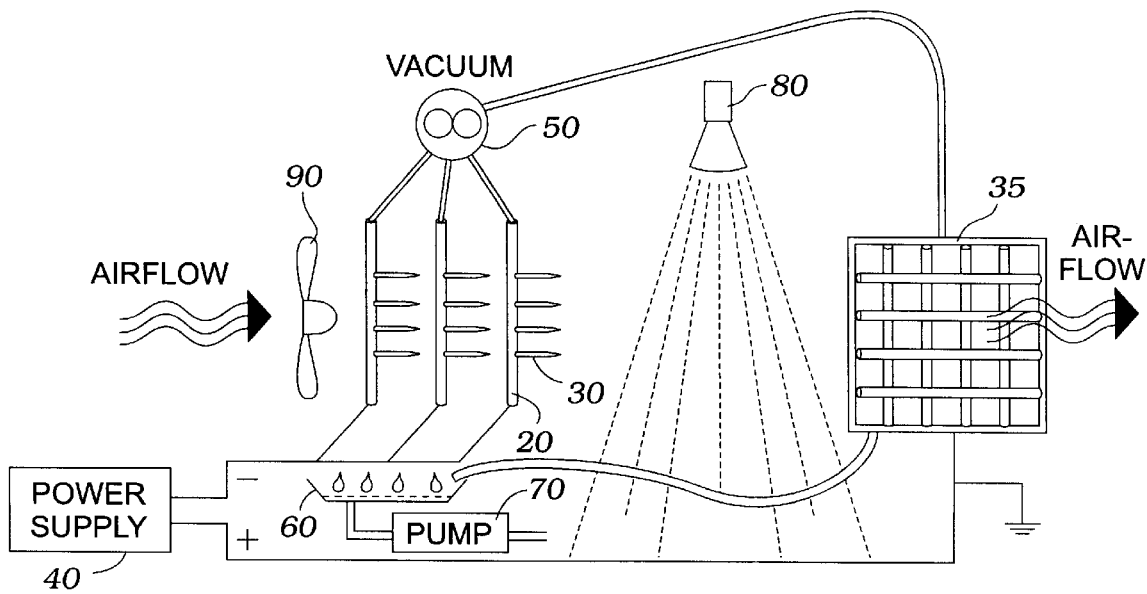
FIG. 4 is a schematic diagram showing the principles of operation of the present invention.
Figure 5:
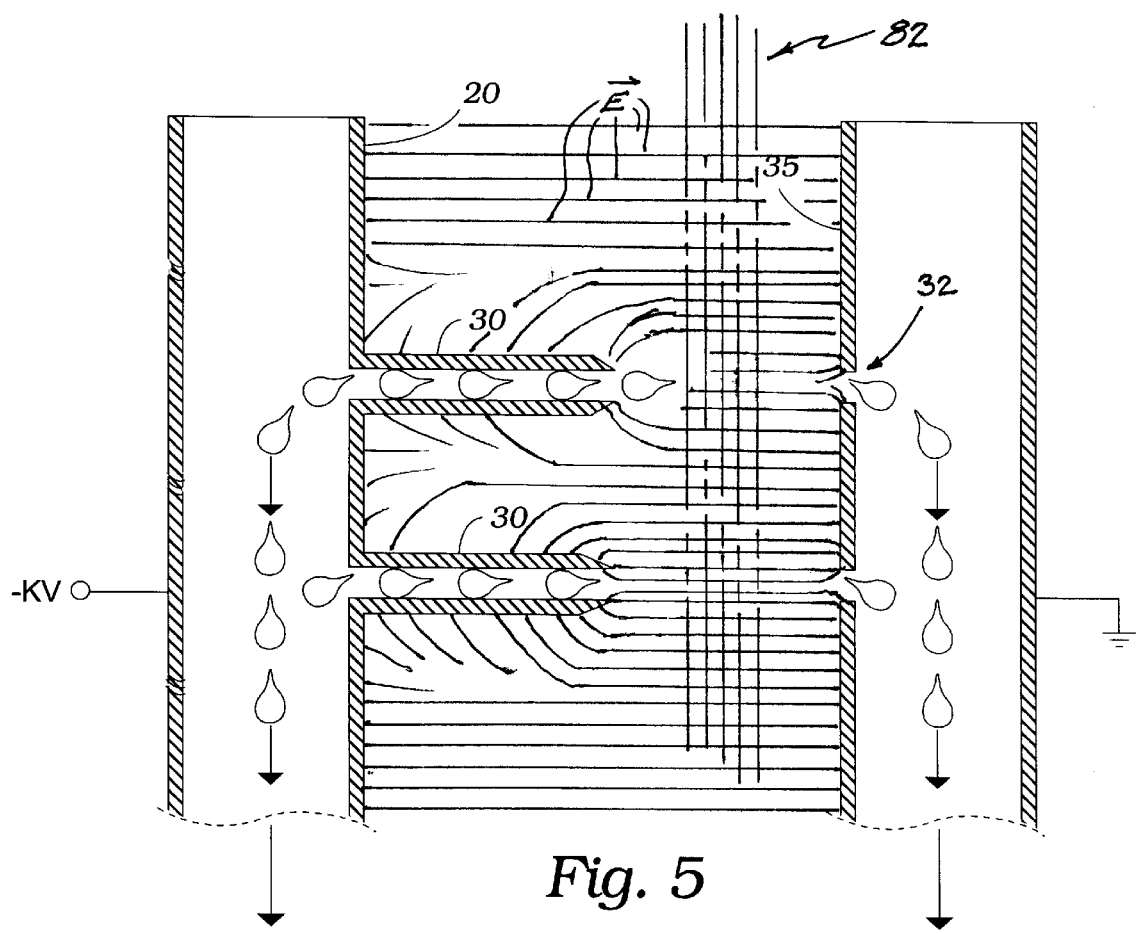
FIG. 5 is an idealized depiction of how moisture droplets are accumulated and transported, under the influence of suction, for collection within the invention.

Moisture laden air flow through the apparatus is forced into the electric field E where ionization of the moisture molecules in the air occurs. The moisture ions are directed along the lines of electrostatic force E toward the holes in the needles 30 as well as to the small holes 32 in the screen particularly because, as is well known to electrical engineers, the lines of force concentrate at sharp edges, and this is depicted in FIG. 5. The ultra-violet light 82 reduces the generation of ozone. As the moisture molecules concentrate at the small openings 32 they combine to form water droplets which are sucked into the tubes 20 and into the tubes that makeup the screen from where they form drips and fall into the pan 60 (FIG. 4). This process is schematically indicated in FIG. 5 where the drips shown are meant to represent drips running downwardly inside the tubes.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An apparatus comprising:
    a case of an electrical non-conducting material, the case including a case wall for enclosing a case volume space;
    a means for enabling an air flow into the case volume space;
    a means for enabling the air flow to exit the case volume space;
    a plurality of hollow support stands extending from the case wall into the case volume space, each of the support stands providing a plurality of hollow needles extending therefrom, each of the needles providing an aperture at a terminal end thereof;
    a high voltage power supply enabled for generating a potential of tens of thousands of static volts relative to ground potential, the potential impressed onto the support stands and the needles;
    a means for providing suction to the support stands and the hollow needles for drawing air from the case volume space through the needles and the support stands so as to draw moisture therein to a sink for collection of condensed water vapor.

2. The apparatus of claim 1 further comprising an air flow forcing means positioned for directing the air flow through the case volume space.

3. The apparatus of claim 2 further comprising a grounded metal screen of such a size and position as to receive the air flow prior to exiting the case volume.

4. The apparatus of claim 3 wherein the potential forms an electric field between the support stands, needles and the grounded metal screen.

5. The apparatus of claim 4 further comprising an ultra-violet light source positioned for directing ultra-violet light across the case volume space between the support stands and the grounded metal screen.

6. The apparatus of claim 3 wherein the grounded metal screen comprises a plurality of tubes, the tubes providing access holes therein for receiving water vapor therethrough, the metal screen being interconnected with the suction producing means so as to induce the condensed water vapor into the plurality of tubes, the tubes positioned for directing the condensed water vapor into the sink.

7. The apparatus of claim 1 further comprising a water pump positioned for exhausting the condensed water vapor from the sink.

* * * * *